(12) United States Patent
Kurz

(10) Patent No.: US 8,740,184 B2
(45) Date of Patent: Jun. 3, 2014

(54) MAGNET VALVE AND DRIVER ASSISTANCE SYSTEM

(75) Inventor: Edgar Kurz, Heilbronn-Horkheim (DE)

(73) Assignee: Robert Bosch GmbH, Stuttgart (DE)

( * ) Notice: Subject to any disclaimer, the term of this patent is extended or adjusted under 35 U.S.C. 154(b) by 443 days.

(21) Appl. No.: 12/976,413

(22) Filed: Dec. 22, 2010

(65) Prior Publication Data

US 2011/0147627 A1    Jun. 23, 2011

(30) Foreign Application Priority Data

Dec. 23, 2009  (DE) .......................... 10 2009 060 294

(51) Int. Cl.
*F16K 31/02* (2006.01)

(52) U.S. Cl.
USPC ...................... 251/129.15; 251/362

(58) Field of Classification Search
USPC ................ 251/129.02, 129.15, 359, 360, 362
See application file for complete search history.

(56) References Cited

U.S. PATENT DOCUMENTS

| 2,846,182 | A | * | 8/1958 | Charlton | ........................ | 251/318 |
| 4,365,747 | A | * | 12/1982 | Knapp et al. | .................. | 239/125 |
| 6,286,544 | B1 | * | 9/2001 | Miyazoe et al. | ......... | 137/505.41 |
| 6,450,590 | B1 | * | 9/2002 | Leventhal | .................. | 303/119.2 |
| 6,778,051 | B2 | * | 8/2004 | Shirase et al. | ................ | 335/278 |
| 7,273,206 | B2 | * | 9/2007 | Sato et al. | ................ | 251/129.15 |
| 7,341,320 | B2 | * | 3/2008 | Otsuka et al. | ............. | 303/119.2 |
| 2003/0201418 | A1 | * | 10/2003 | Ahn | ......................... | 251/129.15 |
| 2009/0278067 | A1 | * | 11/2009 | Voss | ......................... | 251/129.15 |

FOREIGN PATENT DOCUMENTS

| CN | 101541604 A | 9/2009 |
| KR | 1020040040807 A | 5/2004 |

* cited by examiner

*Primary Examiner* — John K Fristoe, Jr.
*Assistant Examiner* — Jessica Cahill
(74) *Attorney, Agent, or Firm* — Maginot, Moore & Beck

(57) ABSTRACT

The invention relates to a magnet valve having a valve body, in which at least one inlet conduit and/or at least one outlet conduit of the magnet valve is provided in at least some regions in the valve body. The inlet conduit and/or outlet conduit are in fluidic communication with a valve seat of the magnet valve. According to the invention, the valve body is provided with a receptacle region, in which an insert part embodying the valve seat is disposed. The invention also relates to a driver assistance system having such a magnet valve.

11 Claims, 3 Drawing Sheets

MAGNET VALVE AND DRIVER ASSISTANCE SYSTEM

CROSS-REFERENCE TO RELATED APPLICATION

This application is based on German Patent Application 10 2009 060 294.1 filed on Dec. 23, 2009.

BACKGROUND OF THE INVENTION

1. Field of the Invention

The invention relates to a magnet valve having a valve body, in which at least one inlet conduit and/or at least one outlet conduit of the magnet valve is provided in at least some regions in the valve body, and the inlet conduit and/or outlet conduit are in fluidic communication with a valve seat of the magnet valve. The invention also relates to a driver assistance system.

2. Description of the Prior Art

Magnet valves of the type defined at the outset are known from the prior art. They are used for instance for ABS, TC or ESP systems. Typically, they are magnet valves with a radial oncoming flow that are closed when without current and are continuously variable. However, still other embodiments of the magnet valve are feasible, for instance being open when without current. The magnet valve has the valve body. The valve body can additionally be surrounded in at least some regions by a housing or can form the housing of the magnet valve. In the valve body, the inlet conduit and the outlet conduit are embodied at least in some regions. The inlet conduit or the outlet conduit is in fluidic communication with the valve seat of the magnet valve. Typically, the valve seat is embodied in the vicinity of a fluid chamber which is present in the valve body. The valve seat is closable by means of a sealing element. The sealing element can preferably be shifted in the axial direction and is disposed in at least some regions in the fluid chamber. The sealing element can assume at least one closing position and one opening position. In the closing position, the sealing element is disposed on or in the valve seat in such a way that there is no fluidic communication between the inlet conduit and the outlet conduit of the magnet valve. Conversely, if the sealing element is shifted at least partly in the direction of its opening position, fluid can flow through the valve seat, so that the fluidic communication is established. Typically, the valve seat is associated with the inlet conduit. The fluid is thus delivered to the magnet valve through the inlet conduit, or an inlet port associated with the inlet conduit, and carried as far as the valve seat. If the valve seat is opened by the sealing element, and thus the sealing element is in its opening position, then the fluid, through the valve seat, can reach the fluid chamber. Next, the fluid flows through the at least one outlet conduit, which is in permanent fluidic communication with the fluid chamber, and out of the fluid chamber. An outlet port of the magnet valve is associated with the outlet conduit. Often, at least the vicinity of the valve body where the valve seat is located is embodied as an integrated component. This means that in this region of the valve body, both the valve seat and still other geometric properties of the valve body must be designed. This makes the production of the valve body complicated and expensive.

ADVANTAGES AND SUMMARY OF THE INVENTION

By comparison, the magnet valve has the advantage that simpler, more-economical production of the magnet valve and valve body is possible. This is attained according to the invention in that in the valve body, a receptacle region is provided, in which an insert part embodying the valve seat is disposed. This means that the valve seat is not directly present on or embodied by a base body of the valve body. Instead, only the receptacle regions for receiving the insert part are provided in or on the valve body. The valve seat is located on the insert part. The base body of the valve body and the insert part are accordingly initially separate parts from one another. Accordingly, the valve body is embodied in multiple parts. Thus the valve body can first be made with the inlet conduit and/or the outlet conduit, and then the insert part can be introduced into the receptacle region. This is especially advantageous in embodiments of the magnet valve in which a radial inflow is provided. In these embodiments, a continuous bore is typically embodied in the axial direction, and radial bores extending from the continuous bore are embodied in the valve body. The valve seat is also embodied in the vicinity of the axial bore. Next, the lower region of the axial bore is closed, in such a way that there is a fluidic communication only from the radial bores to the valve seat. This closure represents an additional production step, which can be dispensed with if the valve body is embodied in multiple parts. It is understood to be equally possible to embody a magnet valve, which has the valve body of the invention with the receptacle region and the insert part, with an axial inflow and a radial outflow. With the procedure and embodiment of the magnet valve in accordance with the invention, it is possible for the valve seat geometry, which is complicated to manufacture, to be embodied separately from other regions of the valve body. The insert part can also comprise a different material from other regions of the valve body, so that in the vicinity of the valve seat, for instance, a material can be employed which can withstand heavier loads or has better wear properties or sealing properties.

A refinement of the invention provides that the insert part at least in some regions has the inlet conduit and/or the outlet conduit or is embodied together with a base body of the valve body. Typically, there is a permanent fluidic communication between either the inlet conduit or the outlet conduit and the valve seat. Accordingly, the insert part, which forms the valve seat, must be designed also for establishing the fluidic communication. For that purpose, the inlet conduit and/or the outlet conduit are located at least in some regions in the insert part. In an alternative embodiment, it may be provided that the inlet conduit or the outlet conduit is formed jointly by the insert part and by the base body of the valve body. For example, the inlet conduit or the outlet conduit can be defined in the circumferential direction by an outer face of the insert part and an inner face of the base body.

A refinement of the invention provides that the insert part and/or the base body has or together form at least one flow conduit between a fluid chamber, fluidically communicating with the outlet conduit, and the outlet conduit. The fluid chamber, which is present in the magnet valve or is embodied by the valve body, is in fluidic communication with the outlet conduit. Thus fluid flowing into the fluid chamber can reach the outlet conduit and through it can flow out of the magnet valve. For establishing this fluidic communication, the flow conduit or a flow line is provided. The flow conduit is for instance in the form of a conduit on or in the insert part or the base body of the valve body. Alternatively, the insert part and the base body can also jointly form the flow conduit. The flow conduit can also be designed in such a way that after flowing through the valve seat, the flow is calmed in the flow conduit before the fluid emerges from the magnet valve through the outlet conduit. That is, the flow conduit is embodied virtually in the form of a calming chamber or calming line.

A refinement of the invention provides that the flow conduit is jointly embodied by a setback embodied in at least some regions on the insert part and/or on the base body. The flow conduit can for instance be embodied by providing that the insert part inserted into the receptacle region has smaller dimensions than the receptacle region. This can be provided by embodying the setback on the insert part or in the receptacle region of the base body.

A refinement of the invention provides that the flow conduit is embodied, in particular in the form of an annular gap, between an inner face of the base body and an outer face of the insert part. The inner and outer faces are spaced apart from one another in such a way that the flow conduit is located between them. As already explained above, for that purpose the setback can be present on the insert part or the base body of the valve body. It is especially advantageous if the flow conduit completely embraces the base body in the circumferential direction. In that case, the flow conduit is in the form of the annular gap. With such an embodiment of the magnet valve, especially efficient calming of the flow is achieved, before the fluid exits the magnet valve through the outlet conduit.

A refinement of the invention provides that the insert part has a base for securing to the base body. The base preferably has larger dimensions than other regions of the insert part. For instance, the insert part can have the setback, so that in at least one region it has smaller dimensions than the receptacle region of the valve body. The base is also provided, in which the insert part has the same or slightly larger dimensions than the receptacle region. Thus the insert part can be securely held in the receptacle region by means of the base, for instance by press-fitting of the base into the receptacle region. The base is disposed such that the flow conduit—if provided—is not blocked by it.

A refinement of the invention provides that the base defines the flow conduit between the fluid chamber and the outlet conduit. Accordingly, the base adjoins the flow conduit that is present between the fluid chamber and the outlet conduit. The side of the base toward the flow conduit can be designed in a streamlined way, for instance extending in inclined or curved fashion in the direction of the outlet conduit. In this way, an especially favorable course of the flow with only slight pressure losses between the fluid chamber and the outlet conduit is attained.

A refinement of the invention provides that the insert part is secured to the base body in form-locking, force-locking and/or material-locking fashion. In principle, the insert part can be held on the base body in an arbitrary way. One simple, economical possibility is to embody the insert part as a press-fitted part, so that after the production of the base body it is press-fitted into the receptacle region and is held there in force-locking fashion. Alternatively or in addition, it is understood that a material-locking or form-locking connection may be provided. A material-locking connection is realized for instance by means of an adhesive.

A refinement of the invention provides that a fluid outlet port of the magnet valve is disposed in an axial or radial direction, and a fluid inlet port of the magnet valve is disposed in the radial or axial direction. The fluid outlet port is associated with the outlet conduit, and the fluid inlet port is associated with the inlet conduit. In a first embodiment of the magnet valve, it is provided that the fluid outlet port is disposed in the axial direction, for instance on an end face of the magnet valve. At the same time, the fluid inlet port is located in the radial direction, for instance on a jacket face of the magnet valve. In an alternative embodiment, conversely, the fluid outlet port is located in the radial direction and the fluid inlet port is located in the axial direction.

The invention further relates to a driver assistance system, in particular an ABS, TC or ESP system, having at least one magnet valve, in particular in accordance with the above descriptions, and having a valve body, in which at least one inlet conduit and/or at least one outlet conduit of the magnet valve is provided in at least some regions in the valve body, and the inlet conduit and/or outlet conduit are in fluidic communication with a valve seat of the magnet valve. In the valve body, a receptacle region is provided, in which an insert part embodying the valve seat is disposed.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
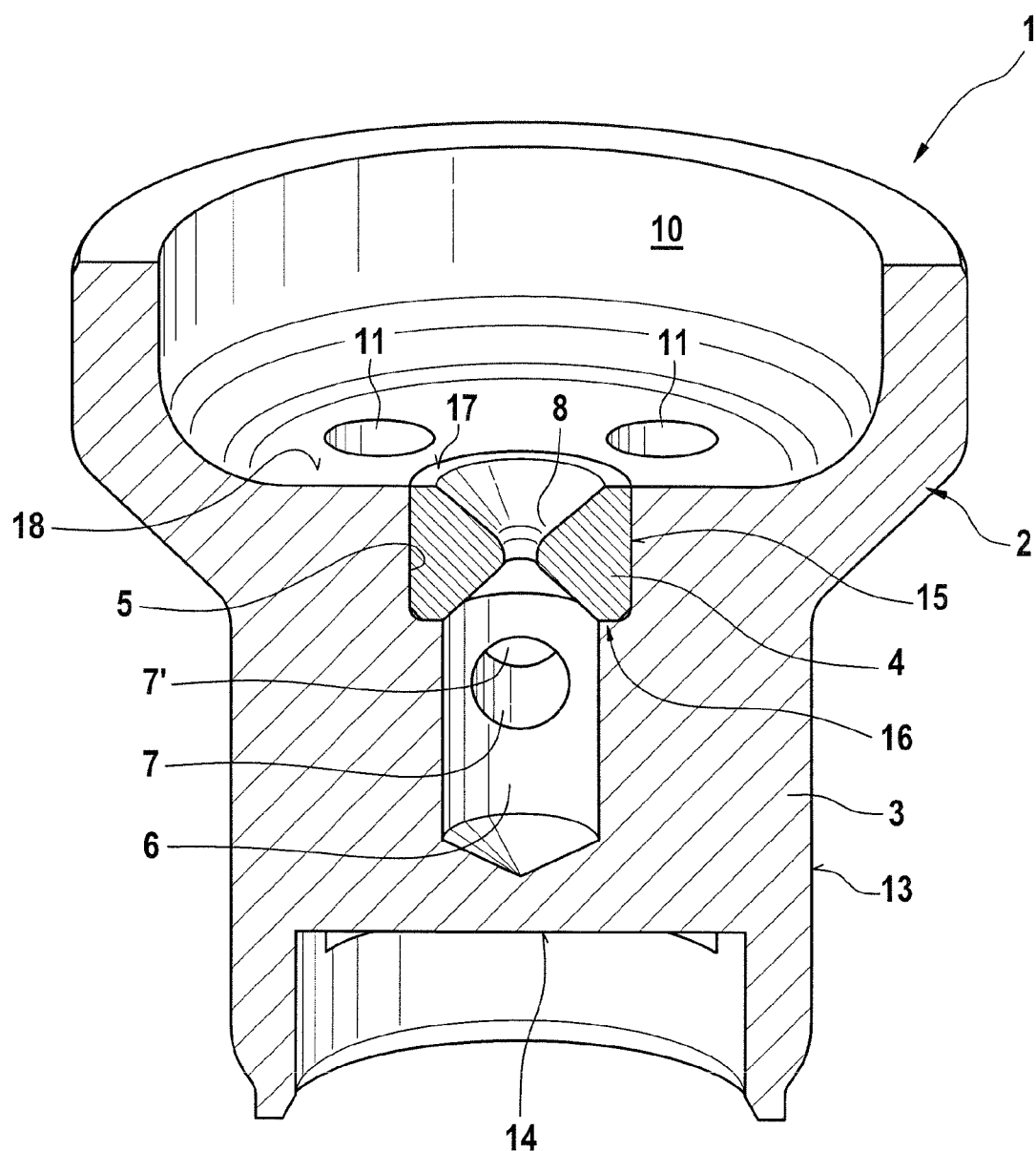
FIG. 1 shows a cross section through a magnet valve with a valve body, in which an insert part is disposed in a receptacle region of the valve body, and the magnet valve is designed for a radial inflow and an axial outflow.

FIG. 1 shows a cross section of a region of a magnet valve 1, in which only one valve body 2 is shown. The valve body 2 comprises a base body 3 and an insert part 4, which insert part is disposed in a receptacle region 5 of the base body 3 or of the valve body 2. A riser conduit 6 is embodied in the valve body 2 and is in fluidic communication via an inlet conduit 7 with at least one inlet port 7'. Via the inlet port 7', the magnet valve 1 can be supplied with a fluid. The fluid supplied through the inlet port 7' flows through a valve seat 8, which is embodied by the insert part 4, when the insert part is opened by a sealing element, not shown here. On the side of the valve seat 8 remote from the riser conduit 6, a fluid chamber 10 is provided, which is embodied in at least some regions by the valve body 2. Moreover, at least one outlet conduit 11, which discharges into the fluid chamber 10, is provided in the valve body 2. There is a permanent fluidic communication between the fluid chamber 10 and the outlet conduits 11, (two outlet conduits 11 are shown in this particular embodiment).

Figure 2:
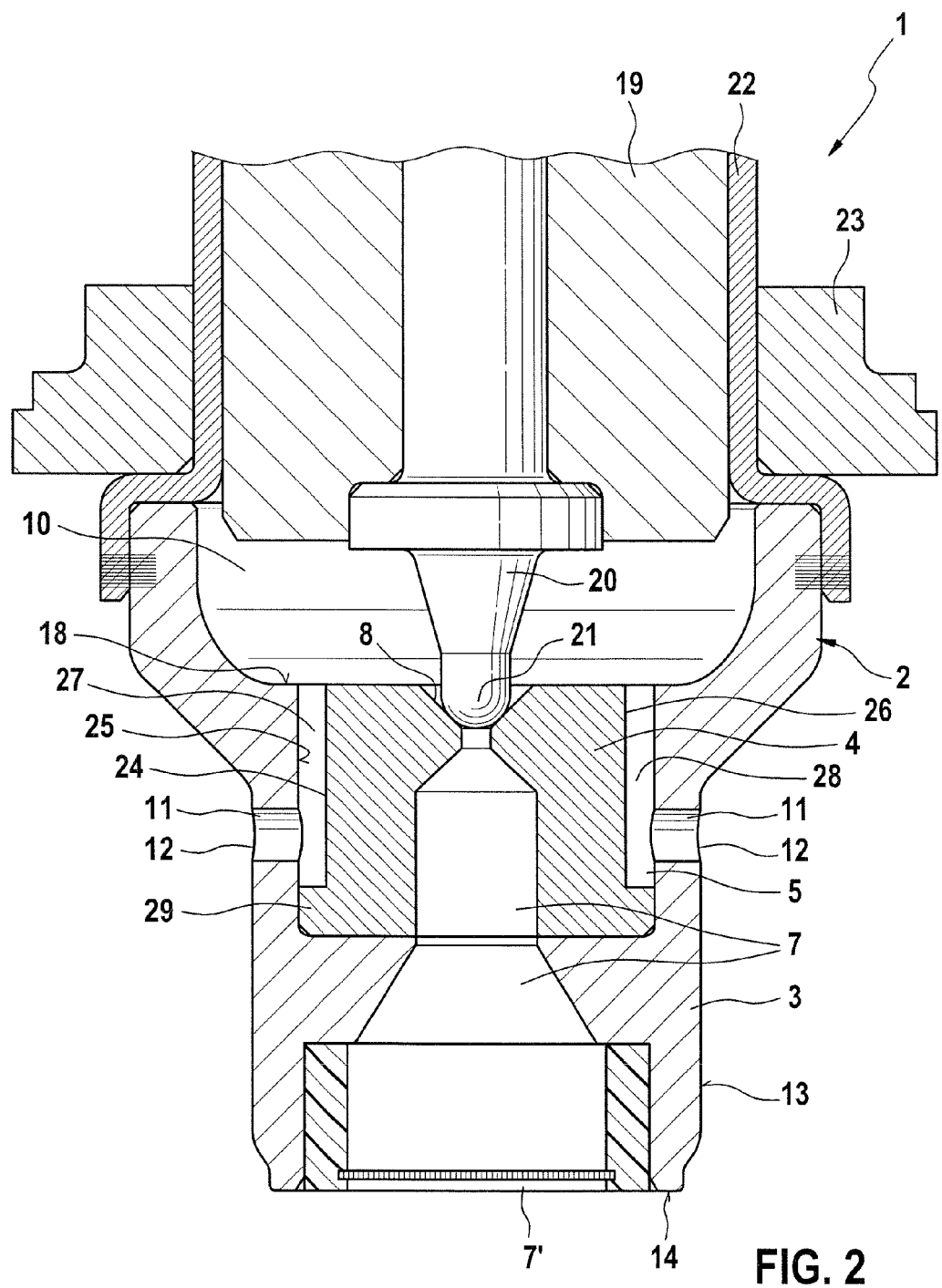
FIG. 2 shows the magnet valve in an alternative embodiment, in which it is embodied for an axial inflow and a radial outflow.
Figure 3:
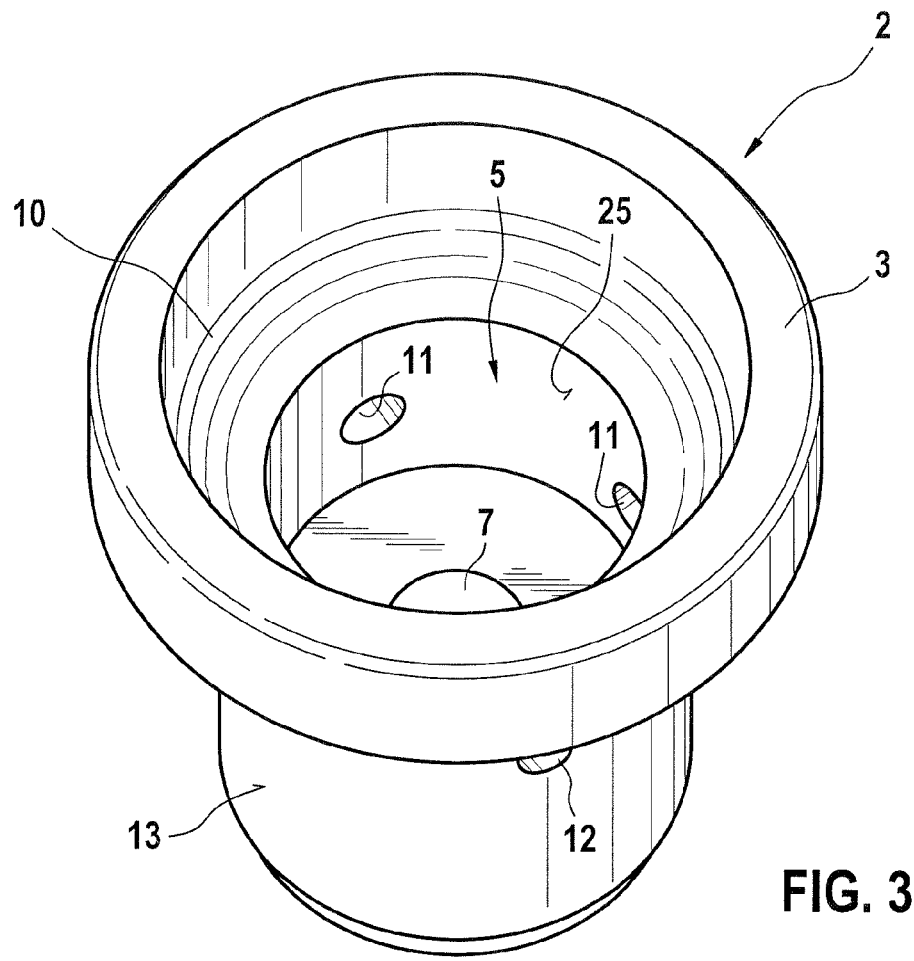
FIG. 3 shows a base body of the valve body.

The magnet valve 1 shown here is thus provided for a radial inflow through the inlet port 7' and an axial outflow through the outlet conduits 11, or through outlet ports 12, shown in FIGS. 2 and 3 that are in fluidic communication with the outlet conduits 11. This should be understood to mean that the magnet valve 1 has the inlet port 7' in a jacket face 13, while the outlet ports 12 are disposed on an end face 14. For holding the insert part 4, a setback 15 of the base body 3 is provided in the receptacle region 5, so that a shoulder 16 is formed for bracing the insert part 4. The insert part 4 is advantageously embodied as a press-fitted part; that is, it is held or secured sufficiently well on the base body 3 merely by being press-fitted into the receptacle region 5. The depth of the receptacle region 5 is preferably provided such that the entire insert part 4 is received in it, so that an annular face 17 of the insert part 4 is flush or aligned with a bottom face 18 of the base body 3. Such an embodiment of the magnet valve 1 has the advantage that the riser conduit 6 can be made in the form of a blind bore. Accordingly, the riser conduit 6 need not be embodied as a continuous bore, as known formerly from the prior art, and then closed off with a closing element, such as a ball, on the side remote from the valve seat 8.

FIG. 2 shows a cross section through a further embodiment of the magnet valve 1. The magnet valve 1 again comprises a valve body 2. However, in addition, a magnet armature 19, an actuating element 20 cooperating with the magnet armature, and a sealing element 21 are shown. The magnet armature 1 is disposed at least in some regions in a housing 22. The magnet valve 1 is disposed and held in an external device 23, only part of which is shown. As already described in conjunction with the embodiment of the magnet valve 1 shown in FIG. 1, the valve body 2 comprises the base body 3 and the insert part 4. The insert part 4 is held in the receptacle region 5 of the base body 3 or of the valve body 2.

In contrast to the above-described embodiment, the magnet valve 1 shown here is designed for an axial inflow and a radial outflow. This means that the inlet conduit 7 extends through the valve body 2 in the axial direction, so that the inlet port 7' is located on the end face 14. Conversely, the outlet conduits 11 are disposed such that the outlet ports 12 are located in the jacket face 13 of the magnet valve 1 and of the valve body 2. The outlet ports 12 are located on the valve body 2 on the same side, with respect to the valve seat 8, as the inlet port 7'. Then the insert part 4 held on the receptacle region 5 also, at least in some regions, embodies the inlet conduit 7. The insert part 4 has a setback 24, so that at least in some regions it has smaller diameters than the receptacle region 5. In particular, both an inner face 25 of the valve body 2 and an outer face 26 of the insert part 4 are circular-cylindrical, and the outer face 26 has a smaller diameter than the inner face 25 and is thus spaced apart from it, whereby the setback 24 of the insert part 4 is formed.

A flow conduit 27 between the fluid chamber 10 and the outlet conduits 11 is produced by the spacing between the inner face 25 and the outer face 26, or in other words by the setback 24. Thus the flow conduit 27 is jointly formed by the insert part 4 and the base body 3 of the valve body 2. The flow conduit 27 is in the form of an annular gap 28, through which fluid can flow.

For securing the insert part 4 to the base body 3, the insert part 4 has a base 29, which is likewise essentially circular-cylindrical. The dimensions of the base 29, however, are the same as or larger than the dimensions of the receptacle region 5, so that a clamping hold of the insert part 4 in the receptacle region is ensured. It can be seen in FIG. 2 that the base 29 defines the flow conduit 27 or the annular gap 28 in the axial direction of the magnet valve 1. The annular gap 28, in the embodiment present here, acts as a calming chamber for fluid flowing from the fluid chamber 10 to the outlet conduits 11. In this way, unwanted turbulence in the flow can be damped or diminished before the fluid emerges from the magnet valve 1 through the outlet ports 12.

Figure 4:
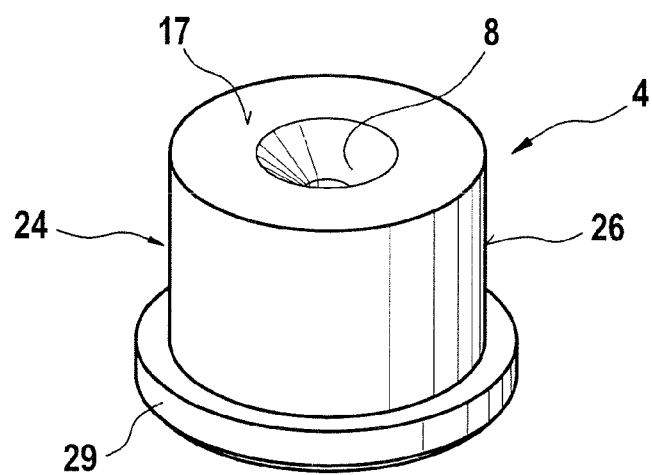
FIG. 4 shows an insert part for being disposed in a receptacle region of the valve body.

FIG. 3 shows the base body 3 of the valve body 2 in an alternative view. In FIG. 4, the insert part 4 is shown by itself. Both the base body 3 and the insert part 4 are in accordance with the descriptions above. In that respect, reference is made to those descriptions.

The foregoing relates to the preferred exemplary embodiments of the invention, it being understood that other variants and embodiments thereof are possible within the spirit and scope of the invention, the latter being defined by the appended claims.

I claim:

1. A magnet valve comprising:
   a base body defining at least one inlet conduit, at least one outlet conduit, and a receptacle region, the at least one inlet conduit and the at least one outlet conduit being in fluidic communication with the receptacle region, the base body including an upper portion that defines an opening to the receptacle region;
   an insert part defining a valve seat for the magnet valve received in the receptacle region and interposed between the at least one inlet conduit and the at least one outlet conduit; and
   a magnet armature having an end portion positioned adjacent the upper portion of the base body and including an actuating element configured to extend from the end portion to engage the valve seat on the insert part, the magnet armature being disposed in a housing that extends from the magnet armature to surround the upper portion of the base body,
   wherein the upper portion of the base body defines a fluid chamber that is in fluid communication with the at least one outlet conduit,
   wherein the insert part defines a fluid conduit therein that extends through the valve seat for fluidly connecting the at least one inlet conduit to the fluid chamber,
   wherein the fluid chamber is formed in part by a bottom surface in the base body, the bottom surface facing generally in an axial direction and being recessed from the opening in the upper portion of the base body, the bottom surface defining a receptacle region opening through which the insert part is inserted into the receptacle region, and
   wherein the insert part includes an end portion that is oriented toward the fluid chamber, the end portion defining the valve seat and including an annular end face that is positioned substantially flush with the bottom surface in the fluid chamber of the base body.

2. The magnet valve as defined by claim 1, wherein an annular gap is defined between an inner face of the base body and an outer face of the insert part that fluidly connects the fluid chamber to the at least one outlet conduit.

3. The magnet valve as defined by claim 2, wherein the insert part is secured to the base body using at least one of a form-locking, force-locking and material-locking connection.

4. The magnet valve as defined by claim 2, wherein the insert part has a base for securing the insert part to the base body in the receptacle region.

5. The magnet valve as defined by claim 4, wherein the outer face of the insert part includes a setback portion that is recessed from the base and defines the annular gap.

6. The magnet valve as defined by claim 4, wherein the insert part is secured to the base body using at least one of a form-locking, force-locking and material-locking connection.

7. A valve body for a magnet valve comprising:
   a base body including a i) receptacle region having a first end and a second end, ii) an upper portion that defines a first opening to the receptacle region at the first end and at least one outlet conduit fluidly connected to the first opening, and iii) a lower portion that defines a second opening to the receptacle region at the second end and at least one inlet conduit fluidly connected to the second opening; and
   an insert part retained in the receptacle region of the base body and having a first end portion oriented toward the first end of the receptacle region and a second end portion oriented toward the second end of the receptacle region, the insert part defining a fluid conduit that extends between the first and second end portions, the first end portion of the insert part defining a valve seat through which the fluid conduit is fluidly connected to the first opening, the second end portion of the insert part defining an inlet opening through which the fluid conduit is fluidly connected to the second opening;

wherein the upper portion of the base body defines a fluid chamber and includes a bottom surface within the fluid chamber in which the first opening to receptacle region is defined, and wherein the first end portion of the insert part has an annular end face that is positioned substantially flush with the bottom surface of the upper portion of the base body.

8. The valve body of claim 7, wherein the second end of the receptacle region is defined by a shoulder region that protrudes into the receptacle region, and wherein the second end portion of the insert part is braced against the shoulder region.

9. The valve body of claim 8, wherein the shoulder region defines the second opening.

10. The valve body of claim 9, further comprising:
a magnet armature including an actuating element configured to extend through the fluid chamber into engagement with the valve seat to block fluid flow through the valve seat into the fluid chamber.

11. The valve body of claim 10, wherein the magnet armature is disposed in a housing that extends from the magnet armature and surrounds the upper portion of the base body.

* * * * *